United States Patent [19]

Bertoni

[11] Patent Number: 5,669,680
[45] Date of Patent: Sep. 23, 1997

[54] TRACKED RUNNING GEAR ASSEMBLY IN PARTICULAR FOR SMALL EXCAVATORS

[75] Inventor: Giovanni Bertoni, Ferrara, Italy

[73] Assignee: Berco S.p.A., Copparo, Italy

[21] Appl. No.: 415,629

[22] Filed: Apr. 3, 1995

[30] Foreign Application Priority Data

Apr. 15, 1994 [IT] Italy .................... MI9400279 U

[51] Int. Cl.⁶ .................................................. B62D 55/15
[52] U.S. Cl. ........................................ 305/119; 305/136
[58] Field of Search ............................. 301/11, 14, 56, 301/57; 305/100, 136, 199, 193, 129, 119

[56] References Cited

U.S. PATENT DOCUMENTS 3,843,214 10/1974 Piepho ........................ 355/14
4,209,205 6/1980 Gregg et al. ................. 305/14
4,695,102 9/1987 Crotti .......................... 305/14 X

*Primary Examiner*—Russell D. Stormer
*Attorney, Agent, or Firm*—Hedman, Gibson & Costigan, P.C.

[57] ABSTRACT

To limit costs without compromising its life while at the same time simplifying its construction, the tracked running gear assembly (1) has its load-bearing wheels (4) and its track tensioning wheel (3) each comprising an idle roller (6) of austempered cast iron maintained on a shaft (7) of construction-type steel by two locking elements (8) of spheroidal graphite cast iron mounted as an interference fit on the ends of said shaft (7). The idle roller (6) comprises a lubricant chamber (9), the seal (19) being housed in the locking elements (8). The sprocket ring (26) of the drive wheel (2) is of austempered cast iron.

16 Claims, 4 Drawing Sheets

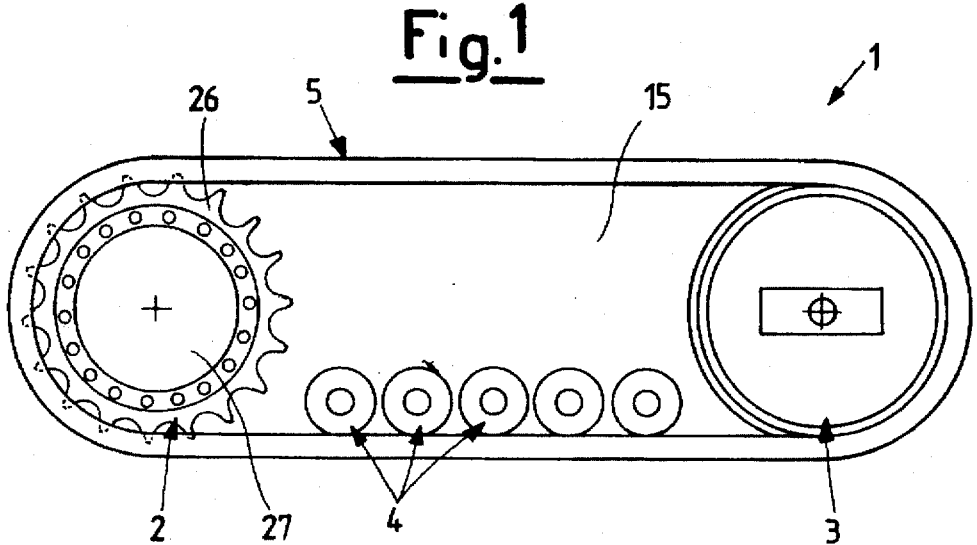
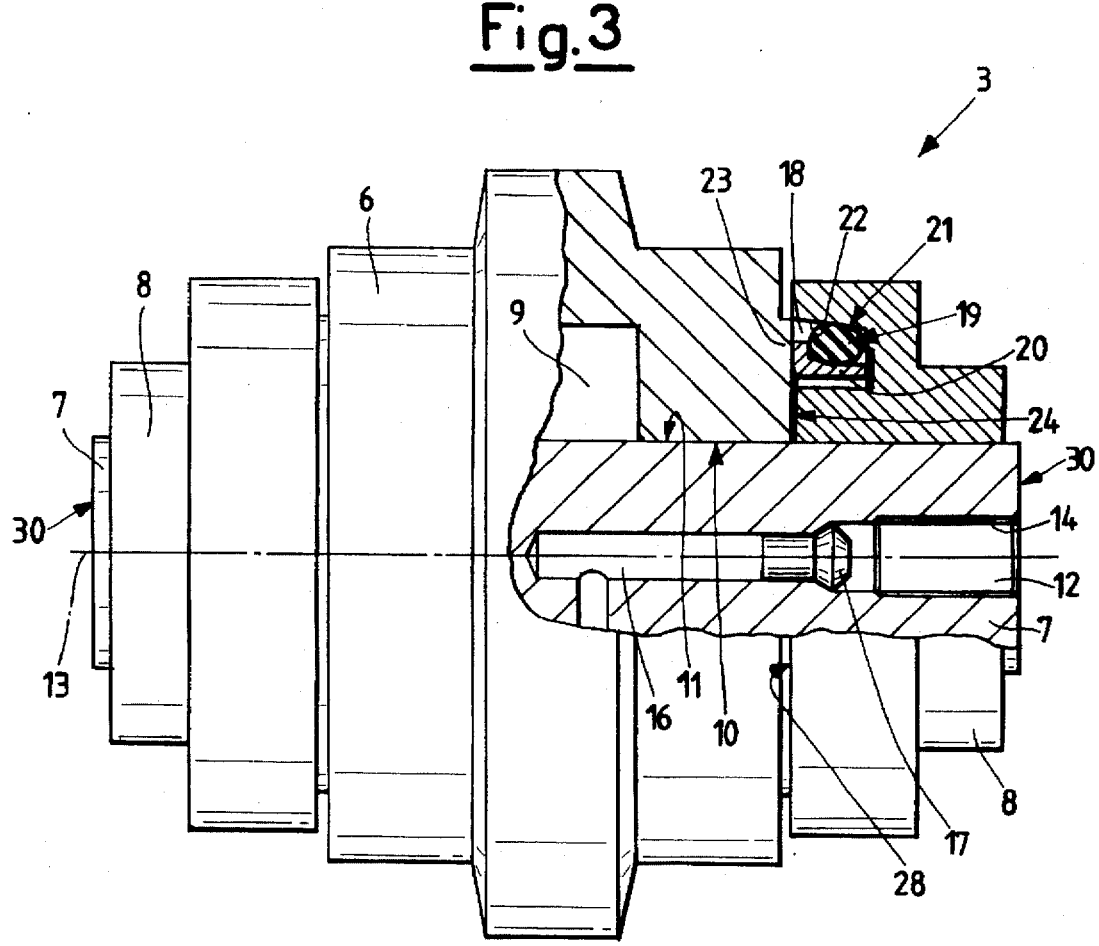

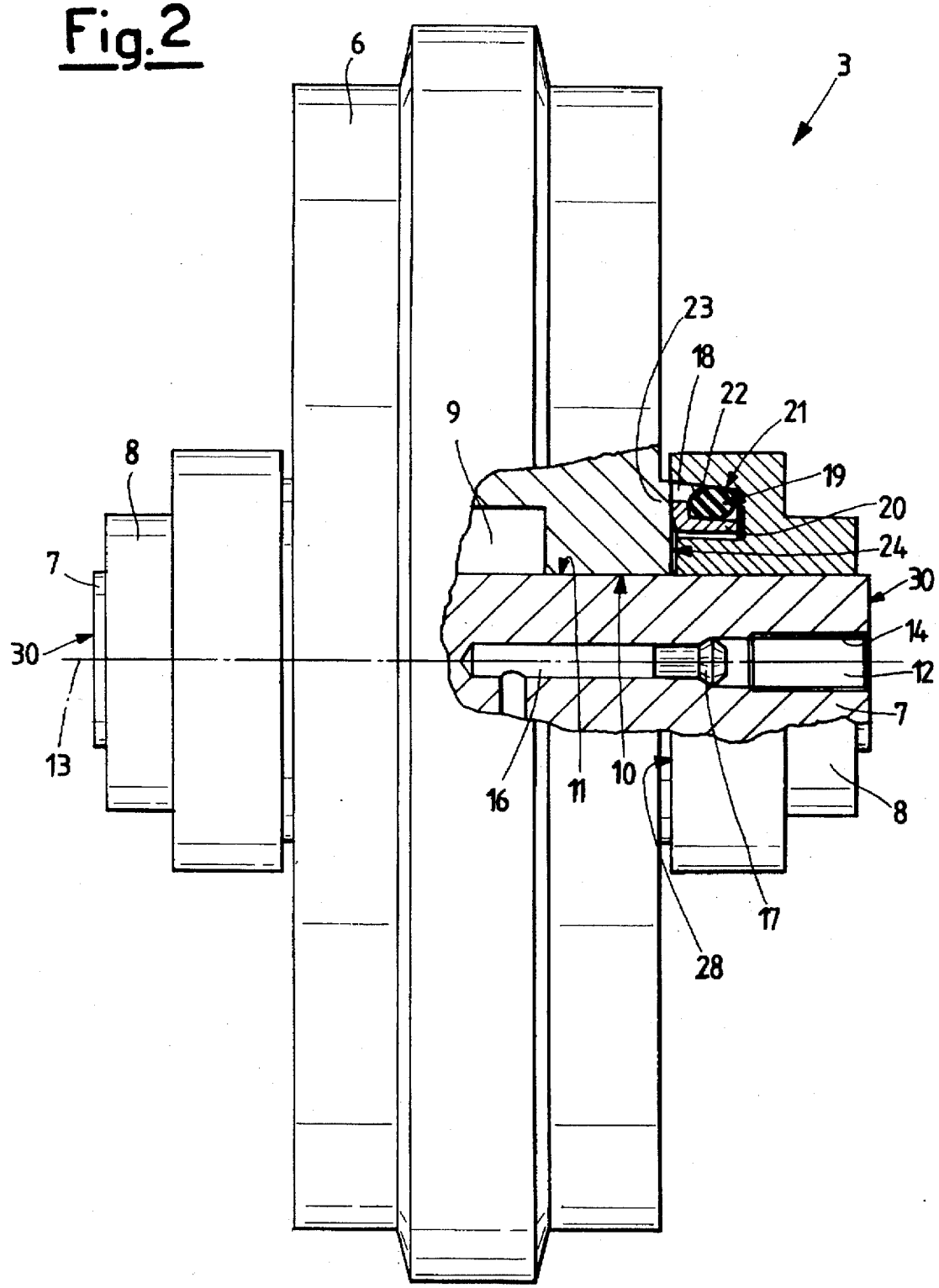

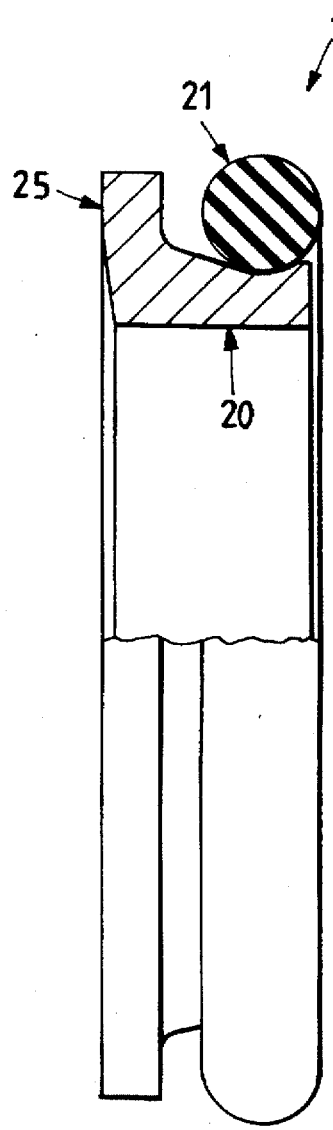
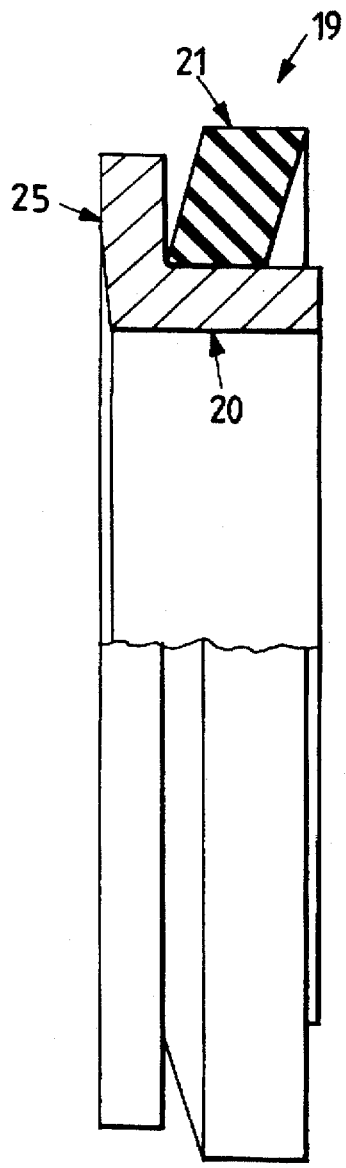
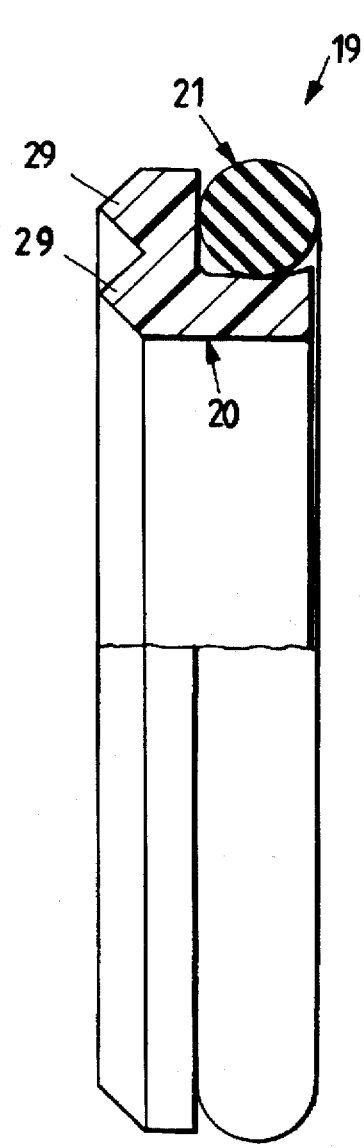

TRACKED RUNNING GEAR ASSEMBLY IN PARTICULAR FOR SMALL EXCAVATORS

This invention relates to a tracked running gear assembly in particular for small excavators.

Running gear assemblies for excavators in accordance with the introduction to the first claim are known.

The constituent mechanical elements of tracked running gear assemblies and in particular of excavators are known to be subjected to particularly intense mechanical stresses and wear. The objective is therefore to provide tracked running gear assemblies which represent the best compromise between cost and life. In the case of medium and large power machines the problem can be solved by the designer by using sophisticated constructions. However in the field of small tracked running gear assemblies such as those for mini-excavators, the task is made more difficult because the use of tendentially sophisticated constructional techniques is not justified, even if technically possible provided problems connected with the dimensioning of the elements are solved. The problem is therefore to optimize the structure of a tracked running gear assembly dedicated in particular to small tracked machines, while using a tendentially simple structure which is hence easy to construct at low cost, and which is worth replacing as soon as the effects of wear appear.

The problem is solved by a tracked running gear assembly in accordance with the first claim.

In said running gear assembly both the track tensioning wheel and the load bearing wheel have the same structure, and are composed of a relatively small and rational number of elements. Even with the absence of bushing or bearings, its life and strength are very satisfactory because the surfaces under relative movement are constantly lubricated because of the use of seal means which prevent the lubricant dispersing to the outside. The considered choice of materials contributes validly to increasing the reliability of the elements.

FIG. 1 is a schematic front view of a tracked running gear assembly according to the invention;

FIG. 2 is a partly full and partly sectional view of a load bearing wheel;

FIG. 3 is a partly full and partly sectional view of a track tensioning wheel;

FIGS. 5–7 are partly full and partly sectional views of a first, second and third embodiment of the seal means respectively.

Figure 4:
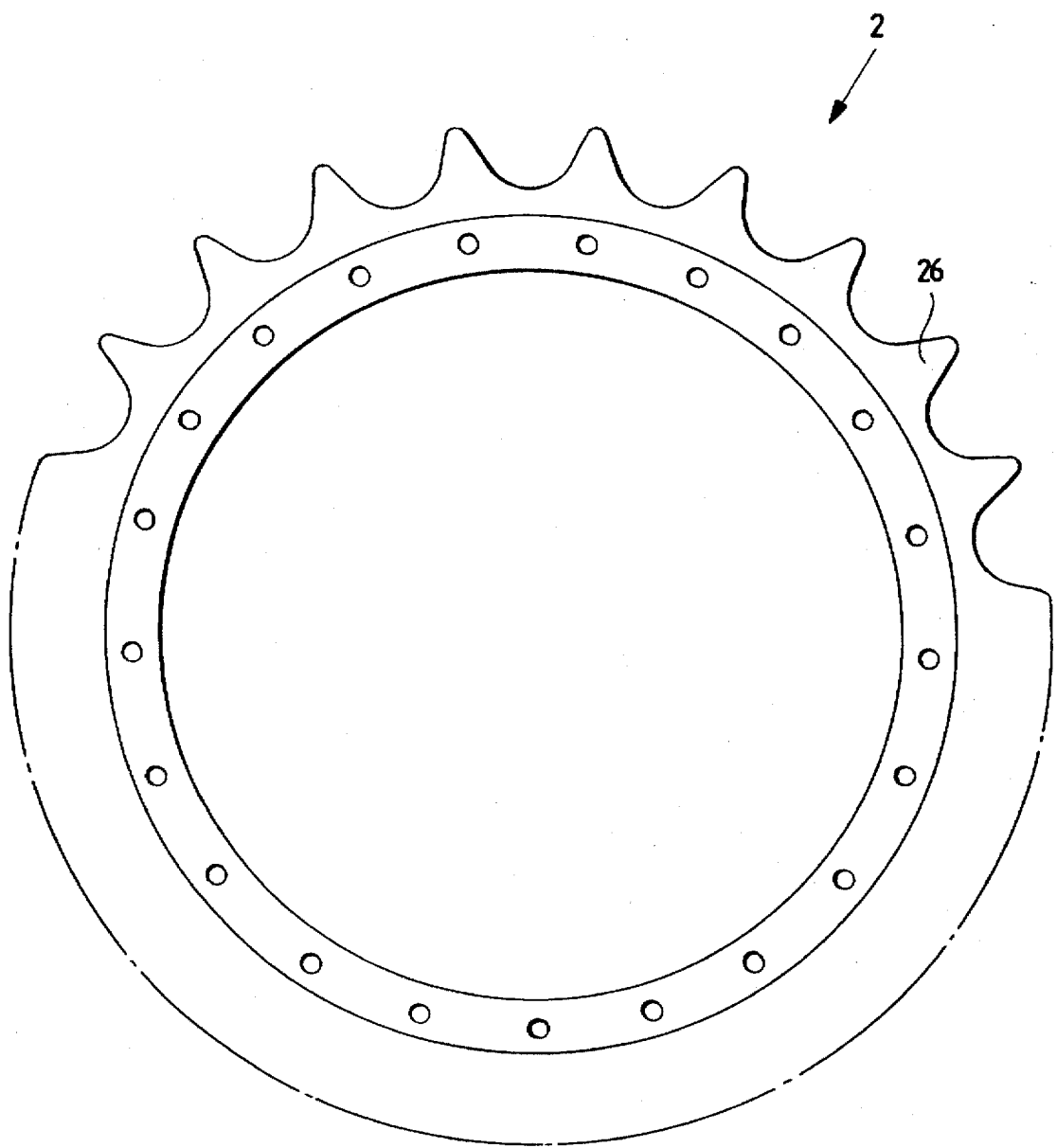
FIG. 4 shows the sprocket ring of the drive wheel.

With reference to the aforesaid figures, the tracked running gear assembly of the invention, indicated overall by 1, comprises essentially a drive wheel 2, a track tensioning wheel 3, a plurality of load bearing wheels 4 and a crawler track 5 which is endless and engages the said wheels 3 and 4 along at least part of their perimeter.

The drive wheel 2 comprises an outer sprocket ring 26 removably fixable (preferably by screw means) to the inner core 27. The outer sprocket ring 26 is formed from spheroidal graphite cast iron of ferritic-pearlitic type subjected to austempering heat treatment. The cast iron from which the sprocket ring 26 of the drive wheel 2 is constructed preferably has the following chemical composition: C 3.5 min; Si 2.5; Mn 0.3; S 0.015 max; P 0.06 max; Ni 0.5; Mo 0.20; Mg 0.04. This cast iron is preferred because, taking account of its use, it represents a good compromise between cost and the mechanical characteristics (including workability by chipping tools) which it is able to offer. Under working conditions, said cast iron has the following mechanical characteristics: hardness 340 HB min, ultimate tensile stress R 1030 MPa min.

The track tensioning wheel 3 comprises a roller 6 arranged to rotate idly on a shaft 7 and maintained thereon by two locking elements 8 mounted as an interference fit on the ends of said shaft 7. The idle roller 6 is constructed of spheroidal graphite cast iron of ferritic-pearlitic type subjected to austempering heat treatment, and preferably the same cast iron as the sprocket ring 26 of the drive wheel 2. The reasons for choosing this cast iron are the same as those already mentioned for the sprocket ring 26 of the drive wheel 2. The idle roller 6 comprises a chamber 9 containing lubricant. The shaft 7 is provided at both ends with a hole 12 extending parallel to the axis 13 of rotation of the wheel 3. The hole 12 is provided internally with a thread 14 engagable by screw means (not shown) for fixing the wheel 3 to the frame 15 of the tracked running gear assembly 1. At least one of said axial holes extends to form a duct 16 which when the track tensioning wheel 3 is mounted communicates with the interior of the lubricant chamber 9. To prevent the lubricant escaping, a plug 17 is provided, forced into the duct 16 on mounting the track tensioning wheel 3.

The shaft 7 is formed from a construction steel preferably of the following chemical composition: C 0.50; Mn 1.00; Cr 0.15; Si 0.30; B 20–40 parts per million.

This steel is preferred because, taking account of its use, it represents a good compromise between cost and the mechanical characteristics (including workability by chipping tools) which it is able to offer. Under working conditions, said steel has the following mechanical characteristics:

in its natural state, ie after simple rolling, the Brinell surface hardness is 170–240 HB, whereas within its core it is 150–240 Hb;

after hardening and tempering, the Brinell surface hardness is 230–290 HB, whereas within its core it is 220 Hb min.;

after surface hardening, the surface hardness reaches 55 HRc min, whereas at a few millimeters depth it reaches 50 HRc.

Said steel can also comprise the following alloying components: niobium, vanadium. In this case a steel is obtained which when in its natural state has mechanical properties comparable with those of the aforesaid steel after hardening. In such a case, as heat treatment is not necessary the cost is reduced without its mechanical characteristics undergoing substantial decrease. Each locking element 8 is axially bored through its entire thickness to enable it to be correctly positioned axially on the shaft 7 when mounting the track tensioning wheel 3 so as to achieve the correct clearance between the elements 8 and the roller 6 which separates them. Each locking element 8 is constructed of spheroidal graphite cast iron and comprises a seat 18 for seal means 19.

The cast iron from which the locking means 8 are constructed is a cast iron chosen from the following:

spheroidal graphite cast iron of prevalently ferritic matrix, type GS 400-12 UNI 4544 with Brinell hardness 150 HB min, ultimate tensile stress 400 MPa min;

vermicular cast iron of prevalently pearlitic structure (also known as grey cast iron with vermicular graphite) of the following indicative chemical analysis: C 3.5; Si 2.50; Mn 0.5 and limitations on the sulphur and phosphorus content; Brinell hardness 145 HB min; ultimate tensile stress 410 N/mm$^2$ min.

The seal means 19, 19', 19" (see FIGS. 5–7 in particular) are of various types. However each type comprises an L-shaped inner annular element 20, 20', 20" associated with a single outer annular element 21, 21', 21" which deforms to form the seal. The deformation to which the outer annular element 21, 21', 21" is subjected is impressed on it by an annular wall 22 of the seat 18, in the illustrated embodiment this wall converging outwards of the track tensioning wheel 3 towards the axis of rotation 13 of said wheel (because of the type of seal means shown); with different seal means it can be more simply a cylindrical cavity, To increase the life of the seal means 19, 19', 19" by protecting them against foreign body infiltration, the annular wall 22 of the seat 18 for the seal means extends to contain, at least to a minimum extent, a shoulder 23 coaxially provided on the idle roller 6. The seal means 19, 19', 19" also exert their action against the front surface 24 of said shoulder. More precisely, the outer surface 25, 25' of the L-shaped inner annular element 20, 20' presses against the front surface 24 of said shoulder 23. To improve the seal and in particular reduce the wear of the contacting parts, the front surface 24 can be lapped. In this case the front surface 28 of the locking element 8 which contacts said front surface 24 is also lapped for the same reasons.

The first seal element shown in FIG. 5 has its inner annular element 20 of metal and its outer annular element 21 of the same material and shape as conventional O-rings. The second seal element shown in FIG. 6 differs from the first mainly by the oblique parallelogram shape of the outer annular element 21'. The third seal element shown in FIG. 7 differs from the preceding mainly in that the inner annular element 20" is of synthetic resin, preferably polyurethane. In addition the inner annular element 20" comprises projections 29 arranged to increase the specific sealing pressure against the surface 24" of the idle roller 6".

To reduce friction to hence increase the life and facilitate the action of the lubricant, those surfaces 10 lateral to the chamber 9 which undergo sliding contact with the outer surface 11 of the shaft 7 can be ground in the same manner as the surfaces 11 of the shaft 7. The machining can be easily done on a mass production scale by automatic machine tools because of the simplicity of the pieces and the position of the surfaces to be machined, these being easily reachable even by common chipping tools.

Because of their structural similarity, the aforestated regarding the track tensioning wheel 3 is totally applicable to each of the load-bearing wheels 4. Consequently the corresponding elements are indicated by the same reference numerals, primed.

The mounting of the track tensioning wheel 3 and of each load-bearing wheel 4 comprises identical stages performable by automatic machines in consideration of the small number of elements involved and the tendentially simple structure of the parts. The procedure comprises aligning three axially hollow elements on one and the same shaft 7. The clearance which the central element must necessarily have between it and the lateral elements so that it does not seize is easily achieved during mounting even if done by automatic machines, because of the fact that the locking elements 8 are bored axially through their entire thickness. In this respect the lateral surfaces 30 of the shaft 7 can be taken as the stop locators for the tool which when fitted to the press forces the locking elements 8 onto the shaft 7.

When the track tensioning or load-bearing wheel has been mounted, the chamber 9 is filled with lubricant (preferably oil of tendentially high viscosity) and then finally plugged by forcing the plug 17 into the duct 16. The wheel is fixed to the frame of the running gear assembly by screw means engaging the thread 14.

I claim:

1. A tracked running gear assembly (1) for small excavators, comprising a frame (15) supporting: a drive wheel (2), a track tensioning wheel (3), and a plurality of load-bearing wheels (4), all of said wheels engaging along a part of their perimeter an endless crawler track (5) having an upper branch and a ground-contacting lower branch, wherein said load-bearing wheels (4) and said track tensioning wheel (3) each comprise an idle roller (6) maintained on a shaft (7) by two locking elements (8) mounted as an interference fit on the ends of said shaft (7); said idle roller (6) comprising a lubricant chamber (9) and being constructed of ferritic-pearlitic spheroidal graphite cast iron subjected to austempering heat treatment; said shaft (7) having an internally threaded (14) axial hole (12) at both ends for fixing the wheel (2, 3) on both sides to said frame (15) of said track running gear assembly (1), wherein at least one of said axial holes (12) extends to form a duct (16), said duct communicating with the interior of said lubricant chamber (9) when said roller (6) is mounted on said shaft (7) and is provided internally with a plug (17), said shaft (7) being constructed of a constructional carbon steel lightly alloyed with chromium and/or boron; each of said locking elements (8) comprising a seat (18) for a seal means (19), said seal means (19) positioned between the locking element (8) and the roller (6), said locking elements (8) being constructed of spheroidal graphite cast iron of prevalently ferritic matrix; said drive wheel (2) comprising a sprocket ring (26) removably fixable to the outside of an inner hub (27) and constructed of spheroidal ferritic-pearlitic cast iron subjected to austempering heat treatment.

2. A tracked running gear assembly as claimed in claim 1, wherein each said locking element (8) is bored axially through its entire thickness.

3. A tracked running gear assembly as claimed in claim 1, wherein:

said idle wheel (6) and said sprocket ring (26) of the drive wheel (2) are constructed of the same cast iron having a chemical composition of: C 3.5 min; Si 2.5; Mn 0.3; S 0.015 max; P 0.06 max; Ni 0.5; Mo 0.20 and Mg 0.04, and having a working hardness of 340 HB min;

said shaft (7) being constructed of a steel having a chemical composition: C 0.50; Mn 1.00; Cr 0.15; Si 0.30; B 20–40 parts per million, and having a working surface hardness of 55 HRc;

said locking elements (8) being constructed of a cast iron chosen from the following:

spheroidal graphite cast iron of prevalently ferritic matrix, type GS 400-12 UNI 4544 with Brinell hardness 150 HB min; or vermicular cast iron of prevalently pearlitic structure with the following indicative chemical analysis: C 3.5; Si 2.50; Mn 0.5 and limitations on the sulfur and phosphorus content; Brinell hardness 145 HB min; ultimate tensile stress 410 N/mm$^2$ min.

4. A tracked running gear assembly as claimed in claim 3, wherein the steel of which the shaft (7) is constructed also comprises the following alloying components: niobium, vanadium.

5. A tracked running gear assembly as claimed in claim 1, wherein said seal means (19) comprises an L-shaped inner annular element (20) associated with a an outer annular element (21); said seat (18) comprises an annular wall (22); and wherein said outer annular element (21) seals against said annular wall (22) of said seat (18).

6. A tracked running gear assembly as claimed in claim 5, wherein said idle roller (6) comprises a shoulder (23)

coaxially thereon; and wherein the annular wall (22) of the seat (18) of the seal means (19) extends to contact said shoulder (23) coaxially provided on the idle roller (6).

7. A tracked running gear assembly as claimed in claim 5, wherein said L-shaped inner annular element (20) of the seal means (19) is comprised of metal and is shaped to diverge away from the front surface (24) of the idle roller (6) in order to increase the specific sealing pressure against the front surface (24) of the idle roller (6).

8. A tracked running gear assembly as claimed in claim 5, wherein the outer annular element (21) is elastically deformable and of circular cross section.

9. A tracked running gear assembly as claimed in claim 5, wherein said deformable outer annular element (21) is deformable and of oblique parallelogram cross-section and wherein said outer annular element (21) is mounted such that the preload to which it is subjected in order to achieve the seal tends to reduce said oblique conformation.

10. A tracked running gear assembly as claimed in claim 5, wherein said L-shaped inner element (20) of the seal means (19) comprises projections (29) arranged to increase the specific sealing pressure against the front surface (24) of the idle roller (6).

11. A tracked running gear assembly as claimed in claim 10, wherein said L-shaped inner element (20) of the seal means (19) is comprised of a synthetic resin.

12. A tracked running gear assembly as claimed in claim 1, wherein said surfaces (24) of the idle roller (6) and those surfaces (25) of the seal means (19) which move relative thereto are lapped.

13. A tracked running gear assembly as claimed in claim 1, wherein the surfaces (24) of the idle roller (6) are lapped.

14. A tracked running gear assembly as claimed in claim 1, wherein the drive wheel (2) comprises a sprocket ring (26) removably fixed to said inner hub (27) by a screw means, and said sprocket ring (26) is constructed of austempered cast iron.

15. A tracked running gear assembly as claimed in claim 5 wherein said outer annular element (21) comprises a single deformable ring.

16. A tracked running gear assembly as claimed in claim 11 wherein said synthetic resin comprises polyurethane.

* * * * *